United States Patent [19]

Tessler et al.

[11] 4,387,221

[45] Jun. 7, 1983

[54] ALKYL- AND ALKENYL-SULFOSUCCINATE STARCH HALF-ESTERS, A METHOD FOR THE PREPARATION THEREOF

[75] Inventors: Martin M. Tessler, Edison; Otto B. Wurzburg, Whitehouse Station; Teresa A. Dirscherl, Netcong, all of N.J.

[73] Assignee: National Starch and Chemical Corporation, Bridgewater, N.J.

[21] Appl. No.: 364,300

[22] Filed: Apr. 1, 1982

[51] Int. Cl.³ .................... C08B 31/02; C08B 31/04
[52] U.S. Cl. .................... 536/107; 536/108; 536/110
[58] Field of Search ............ 536/107, 108, 109, 110

[56] References Cited

U.S. PATENT DOCUMENTS

| | | | |
|---|---|---|---|
| 2,825,727 | 3/1958 | Caldwell | 536/107 |
| 2,884,412 | 4/1959 | Neukom | 536/106 |
| 2,891,947 | 6/1959 | Paschall et al. | 536/110 |
| 2,961,440 | 11/1960 | Kerr et al. | 106/210 |
| 2,989,520 | 6/1961 | Rutenberg | 536/50 |
| 3,077,469 | 2/1963 | Aszalos | 536/111 |
| 3,459,632 | 8/1969 | Caldwell et al. | 536/50 |
| 3,706,771 | 12/1972 | Kremers et al. | 260/501.15 |
| 3,756,966 | 9/1973 | Lamberti | 536/109 |
| 3,791,838 | 2/1974 | Kaplan | 106/210 |
| 3,904,601 | 9/1975 | Tessler et al. | 536/106 |
| 3,910,880 | 10/1975 | Lamberti | 536/109 |
| 3,987,043 | 10/1976 | Lamberti | 260/501.15 |
| 4,029,544 | 6/1977 | Jarowenko et al. | 162/175 |
| 4,061,610 | 12/1977 | Glowaky et al. | 536/110 |
| 4,119,487 | 10/1978 | Tessler | 536/50 |
| 4,139,699 | 2/1979 | Hernandez et al. | 106/210 |
| 4,239,592 | 12/1980 | Gaspar et al. | 162/175 |
| 4,243,479 | 1/1981 | Tessler | 162/175 |

*Primary Examiner*—Ronald W. Griffin
*Attorney, Agent, or Firm*—Edwin M. Szala; Margaret B. Kelley

[57] ABSTRACT

Novel $C_1$–$C_{22}$ alkyl- and $C_3$–$C_{22}$ alkenyl-sulfosuccinate starch half-esters are prepared by reacting a starch base or a modified starch base containing anionic, cationic, and/or nonionic substituent groups with about 0.1 to 100% by weight of the corresponding alkyl- or alkenyl-sulfosuccinic anhydride. The reaction is carried out at pH 5–9 and at 5°–90° C. for 0.5–20 hours or at pH 9–11 at 5°–30° C. for about 0.5–3 hours. This one-step method may also be used to prepare sulfosuccinate half-esters. The long chain derivatives (e.g. octyl-, octadecyl-, octenyl-, and dodecenyl-sulfosuccinate half-esters) are hydrophobic.

13 Claims, No Drawings

ALKYL- AND ALKENYL-SULFOSUCCINATE STARCH HALF-ESTERS, A METHOD FOR THE PREPARATION THEREOF

BACKGROUND OF THE INVENTION

This invention relates to novel alkyl- and alkenyl-sulfosuccinate starch half-esters. It also relates to a one-step method for the preparation of the sulfosuccinate half-ester, as well as the novel alkyl- and alkenyl-substituted sulfosuccinate half-esters. It further relates to modified starch derivatives which contain, in addition to the alkyl- or alkenyl-sulfosuccinate substituent groups, other substituent groups on the starch base.

Starch half-esters containing sulfonyl groups have been prepared by treating granular starch in an aqueous alkaline suspension with the cyclic dibasic acid anhydrides of ethylenically unsaturated organic acids (e.g. maleic, citraconic, itaconic, and crotonic acid) and then treating the resulting unsaturated starch half-esters with sodium, potassium, or ammonium bisulfite to form the sulfonyl-containing saturated half-esters by addition across the double bond (see U.S. Pat. No. 2,825,727 issued Mar. 4, 1958 to C. G. Caldwell). The derivatives show controlled water absorption, greater clarity, and greater resistance to gelling, as well as lowered gelatinization temperature. Amphoteric sulfosuccinate half-esters of fluidity starch bases have been used as pigment retention aids, especially in high alum systems (see U.S. Pat. No. 4,029,544 issued June 14, 1977 to W. Jarowenko et al.). They are prepared using the procedure of U.S. Pat. No. 2,825,727. A granular fluidity starch base (4–40 W.F.) containing cationic or cationogenic substituent groups is reacted with maleic anhydride to form the starch succinate half-ester and then with a bisulfite to form the sulfosuccinate half-ester. In addition to the controlled amounts of cationic quaternary ammonium ether groups or cationogenic aminoalkyl ether groups and sulfosuccinate groups, the derivatives may contain other substituent groups.

As used herein, the term "amphoteric" starch derivatives refers to starch derivatives wherein anionic and cationic (or cationogenic) groups are bonded to the same or to different reaction sites on the starch molecular through a zwitterionic substituent group or through separate anionic and cationic (or cationogenic) substituent groups. The term "cationic" groups is hereafter intended to include cationogenic groups which are nonionic substituent groups capable of forming cations (e.g. diethylaminoethyl ether groups).

The present invention provides novel alkyl- and alkenyl-sulfosuccinate starch half-esters which are hydrophobic when long chain alkyl and alkenyl groups are present. It also provides modified alkyl- and alkenyl-sulfosuccinate starch half-esters which contain other substituent groups. It further provides a one-step method for introducing the sulfosuccinate or alkyl- or alkenyl-sulfosuccinate groups into the starch molecule.

SUMMARY OF THE INVENTION

Novel alkyl- and alkenyl-sulfosuccinate starch half-ester derivatives having the following general structure are provided:

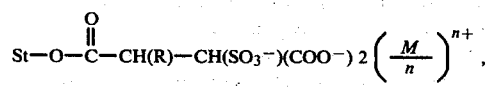

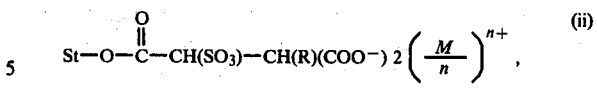

or mixtures of (i) and (ii); wherein St—O— represents a starch molecule or a modified starch molecule (wherein the hydrogen of a hydroxyl group of an anhydroglucose unit has been replaced as shown); R is a $C_1$–$C_{22}$ straight or branched chain alkyl group or mixtures thereof, a $C_3$–$C_{22}$ straight or branched chain alkenyl group or mixtures thereof, or a mixture of alkyl- and alkenyl- groups; M is a cation; and n is the valence number of M.

In the one-step method herein, the starch sulfosuccinate and alkyl- or alkenyl-sulfosuccinates are prepared by reacting a starch base with about 0.1 to 100% by weight, based on dry starch, of sulfosuccinic anhydride or a $C_1$–$C_{22}$ alkyl- or $C_3$–$C_{22}$ alkenyl-sulfosuccinic anhydride and isolating the resulting half-ester. The reactions are carried out at pH of about 5 to 11 and a temperature of about 5°–90° C. for about 0.5–20 hours, with lower reaction temperatures and shorter reaction times being used at a high pH (9–11). They are carried out in an aqueous reaction medium.

The novel alkyl- and alkenyl-sulfosuccinate starch half-esters herein may be modified to increase their anionic characteristics by the introduction of additional anionic substituent groups (e.g. 2-sulfo-2-carboxyethyl ether groups) into the starch molecule using a suitable anionic reagent. They may be modified to render them amphoteric by the introduction of cationic substituent groups (e.g. diethylaminoethyl ether groups or 3-(trimethylammonium chloride)-2-hydroxypropyl ether groups) into the starch molecule using a suitable cationic reagent. They may also be modified by the introduction of zwitterionic substituent groups (e.g. aminophosphonic acid groups) or nonionic substituent groups (e.g. hydroxypropyl ether groups). Reactions in water with the suitable anionic, cationic, zwitterionic, or nonionic reagent should be carried out prior to the anhydride reaction if a high pH (i.e. greater than about 9) is required to catalyze these reactions. Reagents that react with starch at a pH below about 9, (e.g. acetic anhydride, propionic anhydride, succinic anhydride, and the like) can be reacted prior to, after, or simultaneously with the alkyl- and alkenyl-sulfosuccinates herein.

The novel alkyl- and alkenyl-sulfosuccinate starch half-esters herein may be used in applications wherein starch derivatives are typically used, such as in coatings, sizes, adhesives, and the like. Amphoteric starch derivatives are typically useful as pigment and strength retention aids in papermaking, and those containing the sulfosuccinate groups are especially useful in high alum systems.

DESCRIPTION OF THE PREFERRED EMBODIMENTS

The applicable starch bases which may be used in preparing the starch half-ester derivatives herein may be derived from any plant source including corn, potato, sweet potato, wheat, rice, sago, tapioca, waxy maize, sorghum, high amylose corn, or the like. Also included are the conversion products derived from any of the former bases including, for example, dextrins prepared by the hydrolytic action of acid and/or heat;

oxidized starches prepared by treatment with oxidants such as sodium hypochlorite; fluidity or thin-boiling starches prepared by enzyme conversion or mild acid hydrolysis; and derivatized and crosslinked starches. The starch base may be a granular starch or a gelatinized starch, i.e. non-granular starch.

The anionic starches which may be used to prepare the modified alkyl- and alkenyl-sulfosuccinate starch half-esters herein are starch derivatives which are prepared by reacting starch through an etherification or esterification reaction with any reagent which will introduce anionic group(s), such as carboxyalkyl, sulfoalkyl, sulfocarboxyalkyl, and phosphate groups, therein.

The cationic starches which may be used to prepare the amphoteric alkyl- and alkenyl-sulfosuccinate starch half-esters herein are starch derivatives which are prepared by reacting starch through an etherification or esterification reaction with any reagent which will introduce cationic group(s), such as amino (primary, secondary, tertiary, or quaternary), sulfonium, and phosphonium groups, therein.

The nonionic starches which may be used to prepare the modified alkyl- and alkenyl-sulfosuccinate starch half-esters herein are starch derivatives which are prepared by reacting starch through an etherification or esterification reaction with any reagent which will introduce nonionic group(s), such as hydroxyethyl, hydroxypropyl, and acetate groups, therein.

Methods for the preparation of anionic and cationic starch derivatives are discussed in "Starch: Chemistry and Technology", Vol. II, ed. by R. L. Whistler and E. F. Pascall (Academic Press, New York 1967), pages 312–326 and 406–14, respectively. The preparation of anionic, cationic, nonionic, and crosslinked starch derivatives are well-known to those skilled in the art and discussed in the "Handbook of Water-Soluble Gums and Resins," Chapter 22: Starch and Its Modifications, pp. 22:26–28 and 22:37–47, ed. by R. L. Davison McGraw-Hill Book Co., New York 1980). For a discussion of methods for the introduction of phosphate groups, see U.S. Pat. No. 2,884,412 issued Apr. 28, 1959 to H. Neukom or U.S. Pat. No. 2,961,440 issued Nov. 22, 1960 to R. W. Kerr et al.; of sulfonium groups, see U.S. Pat. No. 2,989,520 issued June 20, 1961 to M. W. Rutenberg et al.; of phosphonium groups, see U.S. Pat. No. 3,077,469 issued Feb. 12, 1963 to A. Aszalos; of aminophosphonic acid groups, see U.S. Pat. No. 4,243,479 issued Jan. 6, 1981 to M. M. Tessler.

The alkyl- and/or alkenyl-sulfosuccinic anhydrides which react with the starch base to form the starch derivatives containing alkyl- and/or alkenyl-sulfosuccinate groups, may be prepared using the sulfonation procedure described in U.S. Pat. No. 3,706,771 issued Dec. 19, 1972 to F. J. Kremers et al. In carrying out the sulfonation reaction, the alkyl- or alkenyl-succinic anhydride is dissolved in an anhydrous solvent reaction medium inert to the action of sulfur trioxide. Then liquid sulfur trioxide, dissolved in the same or a different anhydrous solvent, is added slowly to the alkyl or alkenyl-succinic anhydride solution. The sulfur trioxide is employed in a ratio of at least about 1 mole, preferably 1.1 to 1.5 moles, per mole of alkyl- or alkenyl-succinic anhydride. The mixture is agitated and maintained at between about $-5°$ to $35°$ C., preferably at ambient temperature, until the reaction is complete, typically about 15 minutes to 3 hours. The resulting anhdride is recovered by evaporating off the solvent. Suitable solvents include methylene chloride, trichloromonofluoromethane, trichlorotrifluoroethane, hexane, heptane, and preferably 1,2-dichloroethane.

The sulfosuccinic anhydride, which is used in the one-step method to prepare starch sulfosuccinate, may be prepared by sulfonating succinic anhydride using the above procedure except that it is not necessary to dissolve the anhydride in solvent, in which case the reaction mixture is kept in an ice bath during the sulfur trioxide addition.

The starch reactions of this invention are represented by the following equation:

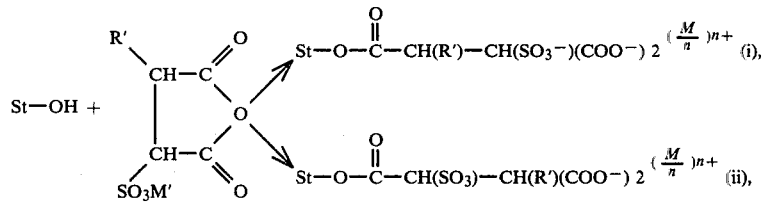

or mixtures of (i) and (ii);

wherein St is a starch base or modified starch base such as an anionic, cationic, zwitterionic, nonionic, and/or crosslinked starch; M' is hydrogen or a tertiary amine; R' is hydrogen, a $C_1$–$C_{22}$ straight or branched chain alkyl group or mixtures thereof, or a $C_3$–$C_{22}$ straight or branched chain alkenyl group or mixtures thereof, or a mixture of alkyl and alkenyl groups, with alkenyl groups preferably having the formula —$CH_2CH=CH(CH_2)_nCH_3$ (n=0–18) and, when branched, preferably having the formulas —CH(CH$_2$—R$^1$)—CH=CH—R$^2$ or —CH$_2$—C(=CH—R$^2$)—CH$_2$—R$^1$, where R$^1$ and/or R$^2$ are alkyl groups containing a total of up to 18 carbon atoms; M is a cation, which may be the same or different, preferably selected from the group consisting of hydrogen, ammonium, an alkali or an alkaline earth metal, and a protonated tertiary amine; and n is valence number of M. When hydrophobic properties are desired, R' should be an alkyl- or alkenyl- group of at least $C_5$, preferably $C_{12}$ or above.

The practitioner will recognize that these starch half-esters may be either acids, salts, or partial salts depending upon the pH of the solution wherein they are used. The practitioner will also recognize that the starch molecule is a polymer which contains many anhydroglucose units, each having three free hydroxyl groups (except the non-reducing end glucose units which contain four free hydroxyl groups) which may react with reagents. Thus, the number of such displacements or the degree of substitution (D.S.) will vary with the particular starch, the ratio of reagent to starch, and to some extent, the reaction conditions. Furthermore, since it is known that the relative reactivity of each of the hydroxyl groups within the anhydroglucose unit is not equivalent, it is probable that some will be more reactive with the reagent than others.

The amount of sulfosuccinic anhydride or alkyl- or alkenyl-sulfosuccinic anhydride reagent to be employed in the reaction with starch herein will vary from about 0.1–100% by weight, based on the weight of dry starch, depending on such factors as the starch base used and the degree of substitution required in the final product. In general, the preferred amount of reagent to be used is 1–20% by weight for granular starches, and 30–100% by weight for non-granular starches.

Typical of the alky-sulfosuccinic anhydrides suitable for use herein are methyl-, ethyl-, propyl-, isopropyl-, butyl- and sec-, iso-, and tert-butyl-sulfosuccinic anhydrides and like sulfosuccinic anhydrides containing alkyl groups up to $C_{22}$ or higher, as well as mixtures of such anhydrides. Suitable alkenyl-sulfosuccinic anhydrides include octenyl-, nonenyl-, dodecenyl-, n-hexadecenyl, iso-octadecenyl-, tri-isobutenyl-, and like sulfosuccinic anhydrides prepared by reacting a linear olefin having the double bond in the 1, 2, or 3-position or a short chain branched polyolefin with maleic anhydride and then sulfonating; 1-octyl-2-decenyl-, 1-hexyl-2-octenyl-, and like sulfosuccinic anhyrides prepared by reacting an internal olefin having the formula $R^3$—$CH_2$—$CH$=$CH$—$CH_2$—$R^4$, where $R^3$ and $R^4$ are at least $C_4$-alkyl groups, with maleic anhydride and then sulfonating; and 2-n-hexyl-1-octenyl-, 2-n-octyl-1-decenyl-, 2-n-dodecenyl-1-octenyl-, 2-n-octyl-1-octenyl-, 2-n-octyl-1-nonenyl-, 2-n-hexyl-1-decenyl-, 2-n-heptyl-1-octenyl-, and like sulfosuccinic anydrides prepared by reacting a vinylidene olefin having the formula

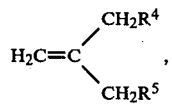

where $R^4$ and $R^5$ are at least $C_5$-alkyl groups, with maleic anhydride and then sulfonating. The reaction of certain of these olefins with maleic anhydride will result in mixtures of anhydrides. When commercially supplied olefins are used, such olefins are very often mixtures of related olefins with one or more species predominant and such olefins will likewise result in mixtures of anhydrides. A typical mixture obtained by reacting octadecene-9 with maleic anhydride will have a $C_{15}$–$C_{20}$ carbon range and may contain branched methyl, ethyl, and/or ethenyl groups.

In the method of this invention, the anhydride reagent is added directly to an aqueous suspension of the starch (about 25–45% solids). Typically the starch reaction is carried out at a pH of about 5–9 and at a temperature of about 5°–90° C. for about 0.5–20 hours or at a pH of about 9–11 at about 5°–30° C. for about 0.5–3 hours. The skilled practitioner will recognize that certain starch esters are readily hydrolyzed at high pH, and therefore must be prepared at a pH at which they are stable. When necessary, alkali is added to the starch slurry prior to the addition of the anhydride reagent to provide the desired pH. The pH is controlled during the reaction by the slow addition of alkali (e.g. sodium, potassium, calcium, or tetramethylammonium hydroxide and the like). Preferably the pH is controlled by the metered addition of 3% sodium hydroxide solution using a pH-sensing device.

The reaction may be carried out at a temperature from 5°–90° C., preferably 20°–45° C. The practitioner will recognize that the use of temperatures above about 60° C. with granular starches in an aqueous medium will result in granule swelling and filtration difficulties or in gelatinization of the starch.

When conducting the reation with granular starches, it may sometimes be desirable to carry out the reaction in the presence of salts (e.g. sodium sulfate) in amounts of from about 10 to 40% by weight, based on dry starch. The presence of sodium sulfate acts to suppress swelling of the starch and gives a more filterable product. Sodium sulfate is not used in the calcium hydroxide reactions.

The reaction mixture is agitated under the desired reaction conditions. The reaction time may vary from 0.5 to 20 hours, depending on such factors as the amount, stability and reactivity of the anhydride reagent employed, the temperature, the pH, the scale of the reaction, and the degree of substitution desired. Typically, the preferred reaction times are from 1–6 hours.

The preferred reaction conditions are about pH 6–9, 20°–45° C., 1–6 hours with about 1–20% of reagent. After completion of the reaction, the pH of the reaction mixture is adjusted, when necessary, to a value of from 3 to 7 with any commercial acid such as hydrochloric, sulfuric, or acetic acid, and the like. Such acids may be conveniently added as a dilute aqueous solution.

Recovery of the resulting starch half-esters may be readily accomplished with the particular method employed being dependent on the form of the starch derivative. If the resulting starch derivative is granular, it is recovered by filtration, preferably washed with water to remove any residual salts, and dried. Granular starch derivatives may also be drum-dried, spray-dried, or gelatinized and isolated by alcohol precipitation or freeze drying to form non-granular products. If the resulting starch derivative is non-granular, it may be purified by dialysis to remove residual salts and isolated by alcohol precipitation, freeze drying, or spray drying.

The following examples will more fully illustrate the embodiments of this invention. In the examples, all parts and percentages are given by weight, all temperatures are in degrees Celsius unless otherwise noted, and D.B. indicates dry basis. In the Tables all percentages are determined on a dry basis, based on dry starch.

EXAMPLE I

This example illustrates the preparation of novel alkyl- and alkenyl-sulfosuccinate starch derivatives prepared by reacting a corn starch base with various sulfosuccinic anhydride reagents.

PREPARATION OF THE SULFOSUCCINIC ANHYDRIDE REAGENTS

Octyl-, octadecyl-, octenyl-, and dodecenyl-sulfosuccinic anhydrides were prepared using the sulfonation procedure described in U.S. Pat. No. 3,706,771 (cited previously). The corresponding succinic anhydrides were dissoved in 1,2-dichloroethane, and liquid sulfur trioxide (100 mole %) dissolved in 1,2-dichloroethane was added slowly to the agitated anhydride solution at ambient temperatures (about 25° C.). After the sulfonation was complete, the solvent was removed using a rotary evaporator.

A mixed, branched $C_{15}$–$C_{20}$ alkenyl-sulfosuccinic anhydride ($C_{18}$ average) containing short chain alkyl and alkenyl branches was likewise prepared by sulfonating the mixed anhydride obtained by reacting a mixed olefin, predominantly octadecene-9, with maleic anhydride.

PREPARATION OF THE STARCH DERIVATIVES

About 100 parts of corn starch were slurried in about 125 parts of tap water, and the pH was adjusted to 8 by the addition of dilute sodium hydroxide (3%). A total of 10 parts of the alkyl- or alkenyl-sulfosuccinic anhydride was added slowly to the agitated starch slurry and the pH was maintained at 8 by the metered addition of the dilute sodium hydroxide. Agitation was continued for from 3–16 hours at ambient temperature. After the reaction was complete, the pH was adjusted to about 5.5 with dilute hydrochloric acid (3:1). The resultant starch half-esters were recovered by filtration, washed three times with water having a pH of about 5–6, and air dried. All of the derivatives showed some hydrophobic properties which made determination of their ester content by saponification unreliable. Table I includes data on the reaction time (and sulfur content of two of the derivatives).

TABLE I

| Derivative | Reaction Time (hr.) |
| --- | --- |
| Octyl-sulfosuccinate | 16 |
| Octenyl-sulfosuccinate (0.10% sulfur) | 3 |
| Octenyl-sulfosuccinate[a.] | 3 |
| Dodecenyl-sulfosuccinate | 6 |
| Octadecyl-sulfosuccinate (0.06% sulfur) | 16 |
| $C_{15}$–$C_{20}$ Alkenyl-sulfosuccinate | 3 |

[a.]Reagent was the protonated triethylamine sulfonic acid salt prepared by reacting triethylamine with octenyl sulfosuccinic anhydride.

EXAMPLE II

This example illustrates the use of the above one-step method to prepare corn, tapioca, and waxy maize sulfosuccinates. The reactions were carried out as in Example I using a sulfosuccinic anhydride reagent prepared according to the sulfonation procedure of U.S. Pat. No. 3,706,771 (cited previously) except that the succinic anhydride was not dissolved in the solvent and the reaction mixture was cooled in an ice bath during the sulfur trioxide addition. The ester content of each starch ester was calculated from its saponification number. The reaction conditions and ester content, as well as the sulfur content of one of the derivatives, are given in Table II.

TABLE II

| | Reaction Conditions | | | | Derivative |
| --- | --- | --- | --- | --- | --- |
| Starch Base | Reagent (wt. % on dry starch) | pH | Temperature (°C.) | Time (hr.) | Ester (%) |
| Corn | 10 | 5 | 25 | 3 | 1.59 |
| Corn | 10 | 6 | 25 | 3 | 2.35 |
| Corn | 10 | 7 | 25 | 3 | 2.86 |
| Corn | 10 | 8 | 25 | 3 | 2.69 |
| Corn | 10 | 9 | 25 | 3 | 2.49 |
| Corn | 10 | 10 | 25 | 3 | 2.48 |
| Corn | 10 | 11 | 25 | 3 | 1.05 |
| Corn | 10 | 8 | 10 | 2 | 3.20 |
| Corn | 10 | 8 | 45 | 2 | 2.80 |
| Corn | 10 | 8 | 25 | 16 | 2.59 a. |
| Corn | 50 | 8 | 87 | 1 | 3.08 b. |
| Corn | 100 | 8 | 87 | 1 | 6.53 b. |
| Tapioca | 10 | 8 | 25 | 3 | 3.43 |
| Waxy Maize | 10 | 8 | 25 | 5 | 4.20 | a. 0.26% Sulfur
b. Non-granular derivative.

The results show that the reaction can be carried out at various temperatures and at a pH of from 5–11, preferably 7–8. The derivatives were not hydrophobic as were the long chain alkyl- and alkenyl-sulfosuccinic derivatives of Example I.

EXAMPLE III

This example illustrates the preparation of the novel alkyl- and alkenyl-starch sulfosuccinates using potato starch, waxy maize starch, and fluidity waxy maize starches as the starch bases. Modified derivatives containing 2-sulfo-2-carboxyethyl ether groups and hydroxypropyl groups were also prepared.

The reactions were carried out at pH 8 and ambient temperature for from 3–16 hours using 10 wt. % of the indicated reagent. The starch was slurried in 150 parts of water instead of 125 parts, and some of the half-ester derivatives were washed with acetone subsequent to the water washings. The starch base and reagent are described in Table III. The derivatives were hydrophobic.

TABLE III

| Starch Base | Alkyl- or Alkenyl- Sulfosuccinic Anhydride Reagent |
| --- | --- |
| Potato | Octenyl-[a.] |
| Waxy Maize | Octadecyl- |
| Waxy Maize, 85 WF[b.] | Octenyl- |
| Waxy Maize, 85 WF | Octadecyl- |
| Waxy Maize, 85 WF | $C_{15}$–$C_{20}$—Alkenyl- |
| Waxy Maize, 50 WF | Octadecyl-[c.] |
| Corn treated with 2.8% 3-chloro-2-sulfopropionic acid[d.] | Octenyl-[a.] |
| Corn treated with 4.5% propylene oxide and cross-linked with 0.015% phosphorus oxychloride[e.] | Octadecyl- |

[a.]Protonated triethylamine salt of the anhydride reagent was used.
[b.]Starch was acid hydrolyzed until the viscosity was 50–85 WF (water fluidity)
[c.]Reagent was 8.5 wt. % instead of 10 wt. %
[d.]Prepared according to the method of Example VIII of U.S. Pat. No. 4,119,487 issued Oct. 10, 1978 to M. M. Tessler (1 hr. reaction time)
[e.]Prepared according to the method of Example III of U.S. Pat. No. 3,904,601 issued Sept. 9, 1975 to M. M. Tessler et al.

EXAMPLE IV

This example demonstrates the preparation of various amphoteric starch derivatives containing the anionic sulfo-succinate and alkyl- and alkenyl-sulfosuccinate groups and cationic diethylaminoethyl ether groups or 3-(trimethyl-ammonium chloride)-2-hydroxypropyl ether groups and their use as pigment retention aids in the manufacture of paper containing pigment and alum.

PREPARATION OF THE AMPHOTERIC DERIVATIVES

The derivatives were prepared as in Example I using a pH of 7–8, ambient temperature, and a 2–4 hr. reaction time. The starch base, reagent, and ester content are given in Table IV.

TABLE IV

| Starch Base | Reagent (wt. %) | Derivative No. |
|---|---|---|
| Corn treated with 1.5% 2-diethylaminoethyl chloride hydrochloride[a] | Sulfosuccinic (3%) | 1 |
| Corn treated with 3.5% 2-diethylaminoethyl chloride hydrochloride[a] | Sulfosuccinic (2%) | 2 |
| Corn treated with 4.5% 3-chloro-2-hydroxypropyl trimethylammonium chloride[b] | Sulfosuccinic (3%) | 3 |
| Corn treated with 4.5% 3-chloro-2-hydroxypropyl trimethylammonium chloride[b] | Sulfosuccinic (4%) | 4 |
| Corn treated with 4.5% 3-chloro-2-hydroxypropyl trimethylammonium chloride[b] | Sulfosuccinic (5%) | 5 |
| Corn treated with 3.5% 2-diethylaminoethyl chloride hydrochloride[a] | Octylsulfo-succinic | 6 |
| Corn treated with 3.5% 2-diethylaminoethyl chloride hydrochloride[a] | Octenylsulfo-succinic (10%) | 7 |
| Corn treated with 3.5% 2-diethylaminoethyl chloride hydrochloride[a] | $C_{15}$-$C_{20}$—alkenyl sulfosuccinic (10%) | 8 |

[a] Prepared according to the method described in Example III of U.S. Pat. No. 4,243,479 issued Jan. 6, 1981 to M. M. Tessler.
[b] Prepared according to the method of Example IV of U.S. Pat. No. 4,029,544 issued June 14, 1977 to W. Jarowenko et al.

EVALUATION AS PIGMENT RETENTION AIDS

Each of the starch derivatives prepared above was divided into two portions, and each portion was dispersed by cooking at atmospheric pressure in a conventional manner. Then the cooked portions were added at a concentration of 0.25%, based on the weight of the dry pulp, to a bleached sulfite pulp which contained a varied amount of paper alum, i.e. aluminum sulfate. The pulps respectively contained 4.0 and 11.0 percent by weight of alum, based on the dry pulp. In each case, the pigment retention value of the test paper stock and those of a control were determined by first preparing paper sheets on the Williams Standard Sheet Mold and then tested for the percent of titanium dioxide ($TiO_2$) retained by the method described in TAPPI, Standard #T413 m. 58. The control consisted of an amphoteric starch ether derivative of the prior art, i.e. the phosphorylated, diethylaminoethyl ether of corn starch containing 0.32% nitrogen and 0.08% phosphorus by weight and prepared as described in U.S. Pat. No. 3,459,632 issued Aug. 5, 1969 to C. G. Caldwell et al. The results of the pigment retention determinations are summarized in Table V.

TABLE V

| Derivative | % $TiO_2$ Retention in presence of Alum | | % of Control | |
|---|---|---|---|---|
| | (4 wt. %) | (11 wt. %) | (4%) | (11%) |
| Control | 70.6 | 54.0 | — | — |
| No. 1 | 57.5 | 53.0 | 81 | 98 |
| No. 2 | 59.5 | 54.9 | 84 | 102 |
| No. 3 | 57.7 | 55.9 | 82 | 104 |
| No. 4 | 58.4 | 54.5 | 83 | 101 |
| No. 5 | 59.7 | 58.0 | 85 | 107 |
| Control | 68.3 | 54.6 | — | — |
| No. 6 | 36.1 | 36.4 | 53 | 67 |
| No. 7 | 38.2 | 35.8 | 56 | 66 |
| No. 8 | 41.5 | 37.8 | 61 | 69 |

The results show that the amphoteric sulfosuccinate derivatives containing cationogenic or cationic ether groups (Nos. 1-5) were as good as and, in some cases, better than the control in high alum systems but not low alum systems. The amphoteric alkyl- and alkenyl-sulfosuccinate derivatives (Nos. 6-8) were poorer than the control in both high and low alum systems, probably due to their hydrophobic properties.

Summarizing, this invention provides novel alkyl- and alkenyl-sulfosuccinate starch half-esters and a novel method for their preparation, as well as the preparation of starch sulfosuccinates, by the reaction of a starch base or a modified starch base with an alkyl- or alkenyl-sulfosuccinic anhydride or sulfosuccinic anhydride.

Now that the preferred embodiments of the present invention are described in detail, various modifications and improvements thereon will become readily apparent to those skilled in the art. Accordingly, the spirit and scope of the invention are to be limited only by the appended claims, and not by the foregoing specification.

What is claimed is:

1. A starch derivative, comprising a starch ester of the general structure:

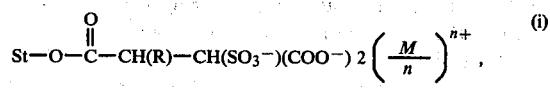

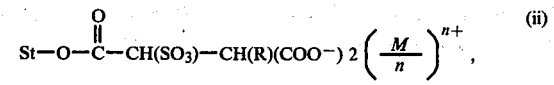

or mixtures of (i) and (ii); wherein St—O— represents a starch molecule or modified starch molecule; R is a $C_1$-$C_{22}$ straight or branched chain alkyl group or mixtures thereof, a $C_3$-$C_{22}$ straight or branched chain alkenyl group or mixtures thereof, or a mixture of said alkyl and alkenyl groups; M is a cation; and n is the valence number of M.

2. The derivative of claim 1, wherein M is hydrogen, ammonium, an alkali or an alkaline earth metal, or a protonated tertiary amine.

3. The derivative of claim 2, wherein M is sodium, potassium, calcium, or protonated triethylamine.

4. The derivative of claim 1, wherein said modified starch molecule contains cationic, anionic, or nonionic substituent groups.

5. The derivative of claim 4, where said cationic groups are diethylaminoethyl ether groups or 3-(trimethylammonium chloride)-2-hydroxypropyl ether groups; said anionic groups are 2-sulfo-2-carboxyethyl ether groups; and said nonionic groups are hydroxypropyl ether groups.

6. The derivative of claim 1, wherein said straight chain alkenyl group has the formula —$CH_2$—CH=CH(—$CH_2$)$_n$—$CH_3$, where n is 0-18, and said branched alkenyl group has the formula —CH(—$CH_2$—$R^1$)—CH=CH—$R^2$ or —$CH_2$—C(=CH—$R^2$)—$CH_2$—$R^1$, where $R^1$ and $R^2$ are hydrogen or one or more alkyl groups containing a total of up to 18 carbon atoms.

7. The derivative of claim 6, where said alkyl groups are octyl or octadecyl groups and said alkenyl groups are octenyl, dodecenyl, or $C_{15}$-$C_{20}$ mixed, branched alkenyl.

8. A starch derivative, which comprises a starch ester or mixture of starch esters prepared by reacting a starch base or modified starch base with about 0.1 to 100% by weight, based on dry starch, of a sulfonated alkyl- or alkenyl-succinic anhydride reagent and isolating the resulting starch ester(s), said sulfonated anhydride reagent being prepared by reacting a $C_1$–$C_{22}$ straight or branched chain alkyl succinic anhydride, or a $C_3$–$C_{22}$ straight or branched chain alkenyl succinic anhydride, or mixtures thereof with liquid sulfur trioxide in an organic solvent.

9. A method for preparing a starch ester derivative of the general structure:

 (i)

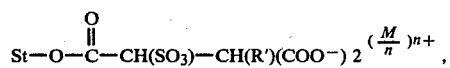 (ii)

or mixtures of (i) and (ii); wherein St—O— represents a starch molecule or a modified starch molecule; R' is hydrogen, a $C_1$–$C_{22}$ straight or branched chain alkyl group or mixtures thereof, a $C_3$–$C_{22}$ straight or branched chain alkenyl group or mixtures thereof, or a mixture of said alkyl and alkenyl groups; M is a cation; and n is the valence of number of M, which comprises the steps of:

(a) reacting a starch base or modified starch base with about 0.1 to 100% by weight, based on dry starch, of an anhydride reagent having the general formula

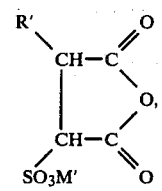

where M' is hydrogen or a tertiary amine and R' is as defined above; and (b) isolating the resulting starch ester.

10. The method of claim 9, wherein said reaction is carried out in an aqueous medium at a pH of about 5–9 and at a temperature of about 5°–90° C. for 0.5–20 hours or at a pH of about 9–11 and at a temperature of about 5°–30° C. for about 0.5–3 hours.

11. The method of claim 9, wherein said reaction is carried out at about pH 6–9 and about 20°–45° C. for about 1–6 hours with about 1–20% of said anhydride.

12. The method of claim 9, wherein said modified starch base is prepared by reacting a starch base with a cationic, anionic, or nonionic reagent.

13. The method of claim 12, wherein said cationic reagent is 2-diethylaminoethyl chloride hydrochloride or 3-chloro-2-hydroxypropyl trimethylammonium chloride; said anionic reagent is 3-chloro-2-sulfopropionic acid; and said nonionic reagent is propylene oxide.

* * * * *